(12) United States Patent
Rangaiah

(10) Patent No.: US 8,189,524 B2
(45) Date of Patent: May 29, 2012

(54) METHOD FOR CELL SELECTION IN A RADIO ACCESS NETWORK

(75) Inventor: Raghavendra Rangaiah, Surrey (GB)

(73) Assignee: Research In Motion Limited, Waterloo, Ontario (CA)

(*) Notice: Subject to any disclaimer, the term of this patent is extended or adjusted under 35 U.S.C. 154(b) by 431 days.

(21) Appl. No.: 12/463,166

(22) Filed: May 8, 2009

(65) Prior Publication Data

US 2009/0285170 A1 Nov. 19, 2009

Related U.S. Application Data

(60) Provisional application No. 61/052,087, filed on May 9, 2008.

(51) Int. Cl.
*H04W 4/00* (2009.01)
(52) U.S. Cl. ........................................ 370/329
(58) Field of Classification Search .............. 370/310, 370/328, 329; 455/403, 422.1, 434, 436
See application file for complete search history.

(56) References Cited

U.S. PATENT DOCUMENTS

| | | | | |
|---|---|---|---|---|
| 6,377,803 B1* | 4/2002 | Ruohonen | | 455/434 |
| 7,162,239 B2* | 1/2007 | Tohono | | 455/434 |
| 7,463,887 B2* | 12/2008 | Roberts et al. | | 455/435.2 |
| 7,653,390 B2* | 1/2010 | Roberts | | 455/434 |
| 2004/0202140 A1* | 10/2004 | Kim et al. | | 370/335 |
| 2005/0153730 A1* | 7/2005 | Turetzky et al. | | 455/550.1 |
| 2007/0037577 A1* | 2/2007 | Dalsgaard et al. | | 455/436 |
| 2009/0067386 A1* | 3/2009 | Kitazoe | | 370/332 |
| 2009/0088154 A1* | 4/2009 | Umatt et al. | | 455/434 |
| 2009/0098873 A1* | 4/2009 | Gogic | | 455/436 |
| 2009/0156206 A1* | 6/2009 | Rathonyi et al. | | 455/434 |
| 2009/0238117 A1* | 9/2009 | Somasundaram et al. | | 370/328 |

OTHER PUBLICATIONS

ETSI TS 125 304 v7.5.0; Universal Mobile Telecommunications System (UMTS); User Equipment (UE) Procedures in Idle Mode and Procedures for Cell Reselection in Connected Mode; (3GPP TS 25.304 version 7.5.0 Release 7) Apr. 2008; 44 pgs.
EPO Search and Examination Report; EP Application No. 09159787.2; Jul. 24, 2009; 7 pgs.
3GPP TS 25.304 v.8.1.0; 3rd Generation Partnership Project; Technical Specification Group Radio Access Network; User Equipment (UE) Procedures in Idle Mode and Procedures for Cell Reselection in Connected Mode; Release 8; Mar. 2008; 41 pgs.

* cited by examiner

*Primary Examiner* — Chi Pham
*Assistant Examiner* — Robert Lopata
(74) *Attorney, Agent, or Firm* — Conley Rose, P.C.; J. Robert Brown, Jr.

(57) ABSTRACT

A method for cell selection in a radio access network covering a geographical area divided into a plurality of cells, the method comprising: searching for a cell on a frequency; checking to see if the cell is a barred cell; and conditional on identifying the cell as a barred cell performing a search for a cell on another frequency.

8 Claims, 6 Drawing Sheets

US 8,189,524 B2

METHOD FOR CELL SELECTION IN A RADIO ACCESS NETWORK

CROSS-REFERENCE TO RELATED APPLICATIONS

The present application claims priority to U.S. provisional patent application No. 61/052,087, filed May 9, 2008, by Raghavendra Magadi Rangaiah, entitled "Method for Cell Selection in a Radio Access Network" (33686-US-PRV-4214-08700), which is incorporated by reference herein as if reproduced in its entirety.

TECHNICAL FIELD

This application relates to telecommunication systems in general, having for example application in UMTS (Universal Mobile Telecommunications System) and in particular relates to a method and apparatus for cell selection in a radio access network (RAN).

BACKGROUND

In a typical cellular radio system, mobile user equipment (UE) communicates via a radio access network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the present disclosure is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Cell selection, sometimes referred to as cell search, for a UE is described in the 3GPP TS 25.304 specification, v 8.1.0, "User Equipment (UE) procedures in idle mode and procedures for cell reselection in connected mode" which is incorporated herein by reference and referred to herein as the 25.304 specification. Section 5.2.3 and in particular section 5.2.3.1.1 of the 25.304 specification describes the cell selection process.

BRIEF DESCRIPTION OF THE DRAWINGS

Embodiments will now be described, by way of example only, with reference to the attached drawings, in which.

DETAILED DESCRIPTION OF THE DRAWINGS

Section 5.2.3.1.1 of the 25.304 specification states that "The UE shall use one of the following two search procedures: (a) Initial Cell Selection. This procedure requires no prior knowledge of which RF channels are UTRA carriers. The UE shall scan all RF channels in the UTRA bands according to its capabilities to find a suitable cell. On each carrier, the UE need only search for the strongest cell. Once a suitable cell is found this cell shall be selected. (b) Stored Information Cell Selection. This procedure requires stored information of carrier frequencies and optionally also information on cell parameters, e.g. scrambling codes, from previously received measurement control information elements. Once the UE has found a suitable cell the UE shall select it. If no suitable cell is found the Initial cell selection procedure shall be started."

Potential problems with existing cell selection methods may include (i) a delay may be experienced during emergency calls, (ii) there may be a negative impact on battery life, and (iii) there may be a negative impact on user experience.

An aspect of the disclosure relates to a method for cell selection in a radio access network covering a geographical area divided into a plurality of cells. The method may comprising searching for a cell on a frequency; checking to see if the cell is a barred cell; and conditional on (or in dependence on or based on) identifying the cell as a barred cell performing a search for a cell on another frequency.

Another aspect of the disclosure relates to a mobile communication device for use in a radio access network covering a geographical area divided into a plurality of cells. The device may comprise: one or more processors; a wireless transceiver coupled to the one or more processors; and memory coupled to the one or more processors. The one or more processors may be operative to search for a cell on a frequency; check to see if the cell is a barred cell; and conditional on (or in dependence on or based on) identifying the cell as a barred cell perform a search for a cell on another frequency.

Another aspect of the disclosure relates to a computer program product comprising program code stored on a computer readable medium. The program code may be arranged, in use, to search for a cell on a frequency; check to see if the cell is a barred cell; and conditional on (or in dependence on or based on) identifying the cell as a barred cell perform a search for a cell on another frequency.

Other aspects and features of the present teaching will become apparent to those ordinarily skilled in the art upon review of the following description of specific embodiments of a method and apparatus for cell selection in a telecommunication system and the accompanying claims.

Figure 1:
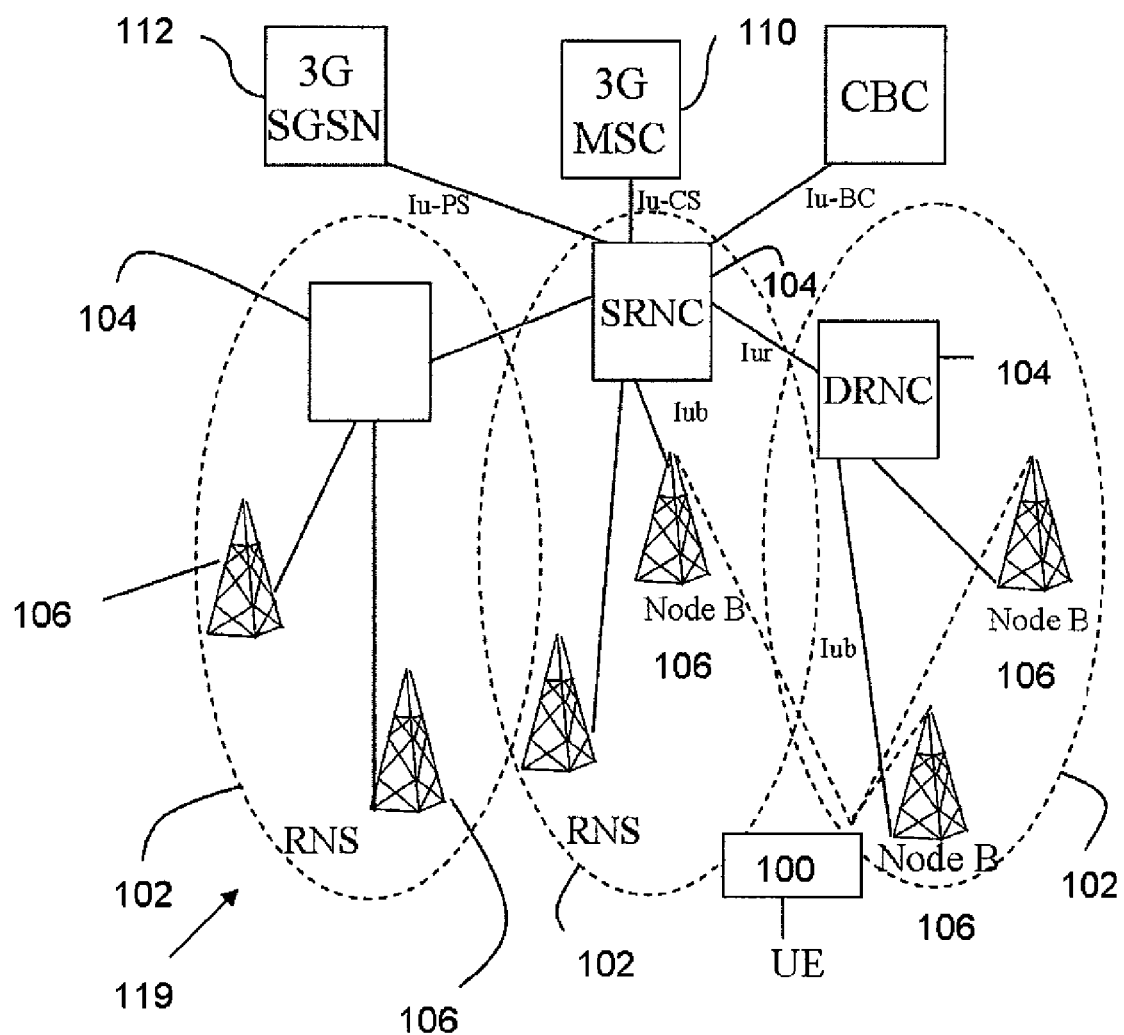
FIG. 1 is a schematic diagram showing an overview of a network and a UE device.

The method disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Figure 2:
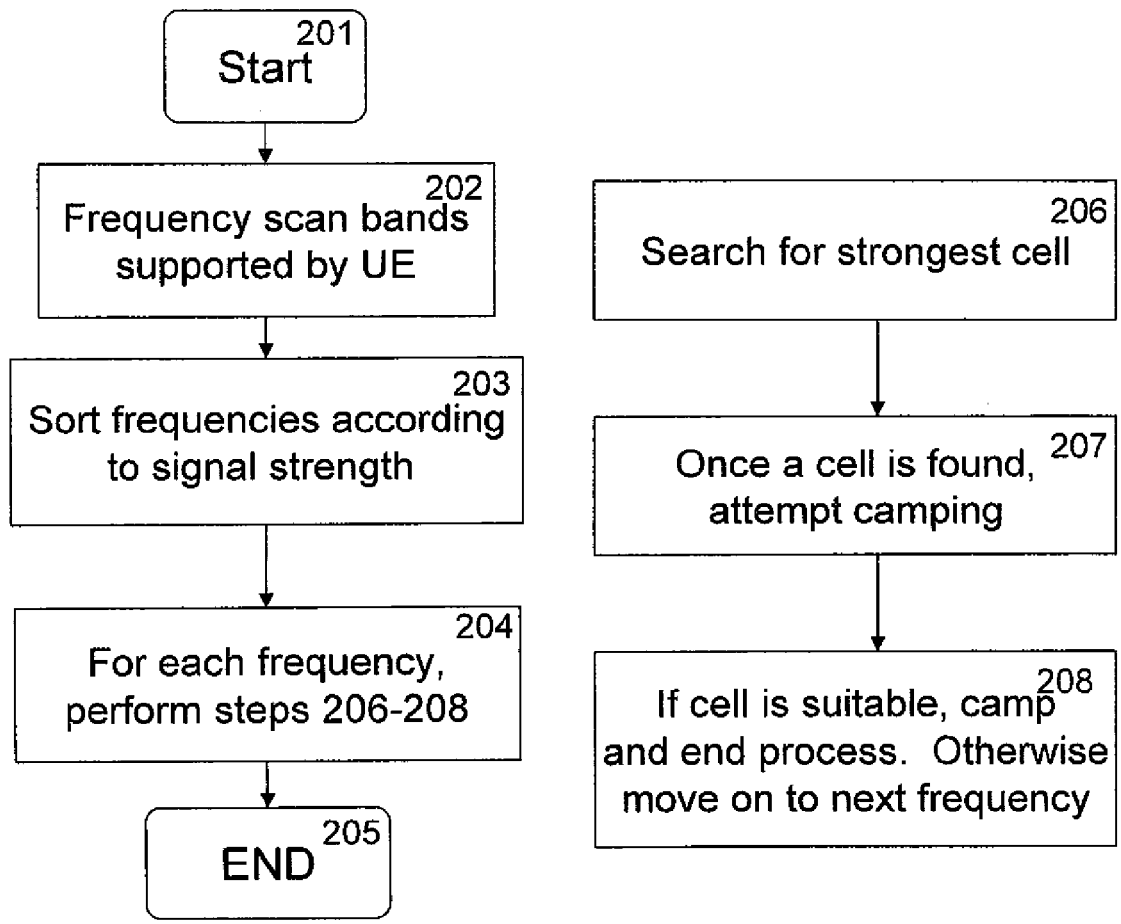
FIG. 2 is a flow diagram showing processes performed by a UE during a known automatic cell selection procedure.

FIG. 2 is a flow diagram showing processes performed by a UE during a known automatic cell selection procedure in a UMTS system.

Referring to FIG. 2 the process starts at 201. At 202, frequency scanning of all bands supported by the UE is performed. The frequency scanning obtains a signal strength indicator value (a Received Signal Strength Indicator (RSSI) value) for each frequency. At 203 the frequencies are sorted according to the signal strength by sorting them by their respective RSSI values. At 204, for each frequency in decreasing order of RSSI value (i.e. highest RSSI value first), 206 to 208 are performed. That is, 206 to 208 are performed for each frequency until a cell is camped on or all frequencies are exhausted (and there is no cell to camp on).

At 206, the strongest cell on the frequency is searched for using the layer 1 cell search procedure. For details of the layer 1 cell search procedure, which is implementation dependent, see 3GPP TS 25.214: "Physical layer procedures (FOD)" and 3GPP TS25.224: "Physical Layer Procedures (TDD)", both of which are incorporated herein by reference. At 207, once a cell is found the UE will try that cell for camping by setting up a Primary Common Control Physical Channel (PCCPCH) and reading Master Information Blocks (MIBs) and System Information Blocks (SIBs). At 208, if the cell is a suitable cell (a cell on which a UE may camp) the UE camps on to the cell and the process ends (by moving to 205). A suitable cell is one which for example has acceptable signal strength, is not in a forbidden location area, is not barred and, for an automatic search, belongs to the correct Public Land Mobile Network (PLMN). Otherwise, the UE then moves on to the next frequency, if there is one, by performing 206 to 208 for the frequency which has the next highest RSSI value. If all frequencies are exhausted (i.e. there is no cell to camp on) the process ends at 205.

FIG. 2 shows the process for a known automatic search. For a known manual search is performed, 206-208 are replaced by 206m-208m of FIG. 3.

Figure 3:
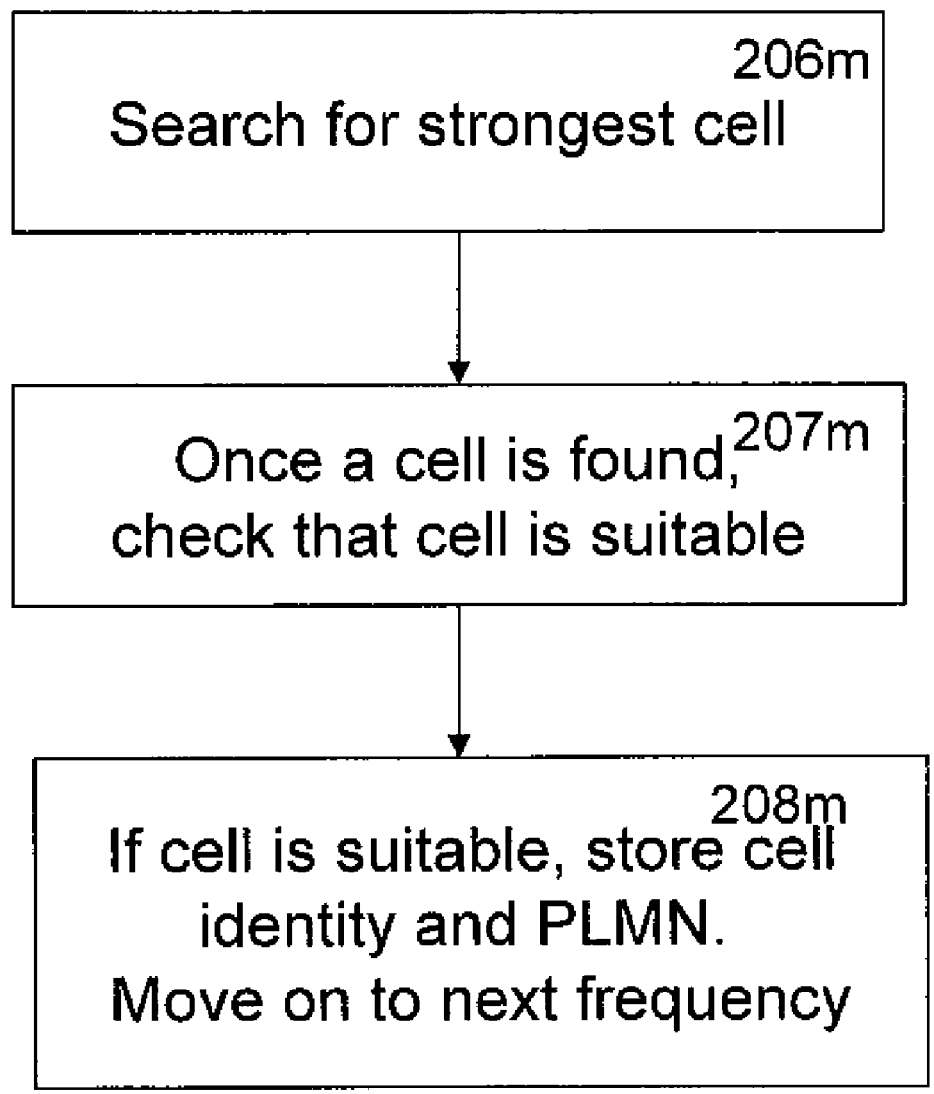
FIG. 3 is a flow diagram showing processes performed by a UE during a known manual cell selection procedure.

Referring to FIG. 3, at 206m, as for 206, the strongest cell on the frequency is searched for using the layer 1 cell search procedure. At 207m, once a cell is found the UE will check that the cell is suitable by setting up a PCCPCH and reading MIBs SIBs, obtaining the information including the signal strength and PLMN from the MIB, and checking suitability by for example checking that the signal strength is acceptable, that the cell is not in a forbidden location area, and that the cell is not barred. If the cell is suitable, at 208m the cell identity using the Primary Scrambling Code (PSC) and Frequency of the cell is stored along with the PLMN for inclusion in a PLMN list (for displaying to a user to select a network after the manual search). The UE then moves on to the next frequency, if there is one, by performing 206m to 208m for the frequency which has the next highest RSSI value.

Figure 4:
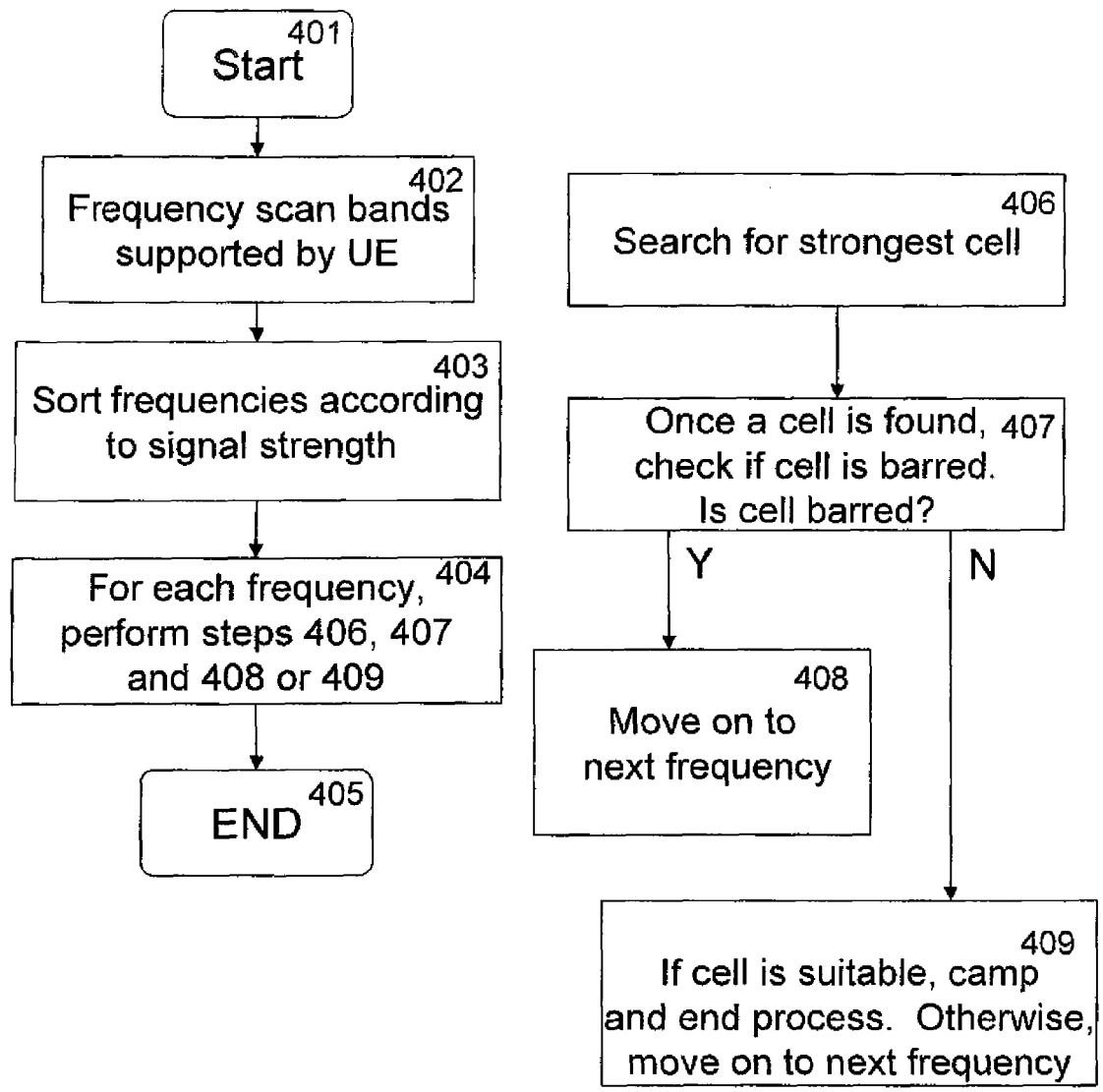
FIG. 4 is a flow diagram showing processes performed by a UE during an automatic cell selection procedure in accordance with an embodiment of the present disclosure.

FIG. 4 is a flow diagram showing processes performed by a UE during a cell selection procedure in accordance with an embodiment of the present disclosure in a UMTS system.

Referring to FIG. 4 the process starts at 401. At 402, frequency scanning of all bands supported by the UE is performed. The frequency scanning obtains a signal strength indicator value (a Received Signal Strength Indicator (RSSI) value) for each frequency. At 403 the frequencies are sorted according to the signal strength by sorting them by their respective RSSI values. At 404, for each frequency in decreasing order of RSSI value (i.e. highest RSSI value first), 406 and 407 are performed together with 408 if the cell is a barred cell (a cell a UE is not allowed to camp on) or with 409 if the cell is not a barred cell. That is, 406, 407 and 408 or 409 are performed until a cell is camped on or all frequencies are exhausted (and there is no cell to camp on).

At 406, the strongest cell on the frequency is searched for using the layer 1 cell search procedure. At 407, once a cell is found a check is made to see if the cell is a barred cell. If the cell is a barred cell, 408 is performed. That is, the UE moves on to the next frequency, if there is one, by performing 406, 407 and 408 or 409 for the frequency which has the next highest RSSI value.

If the cell is not a barred cell when the check of 407 is made, 409 is performed where the UE will check that the cell is a suitable cell (a cell on which a UE may camp) by setting up a PCCPCH and read MIBs and SIBs, obtaining information including the signal strength, and checking for example that the signal strength is acceptable, and camp on before ending the process. Otherwise, the UE moves on to the next frequency, if there is one, by performing 406 to 408/409 for the frequency which has the next highest RSSI value.

Figure 5:
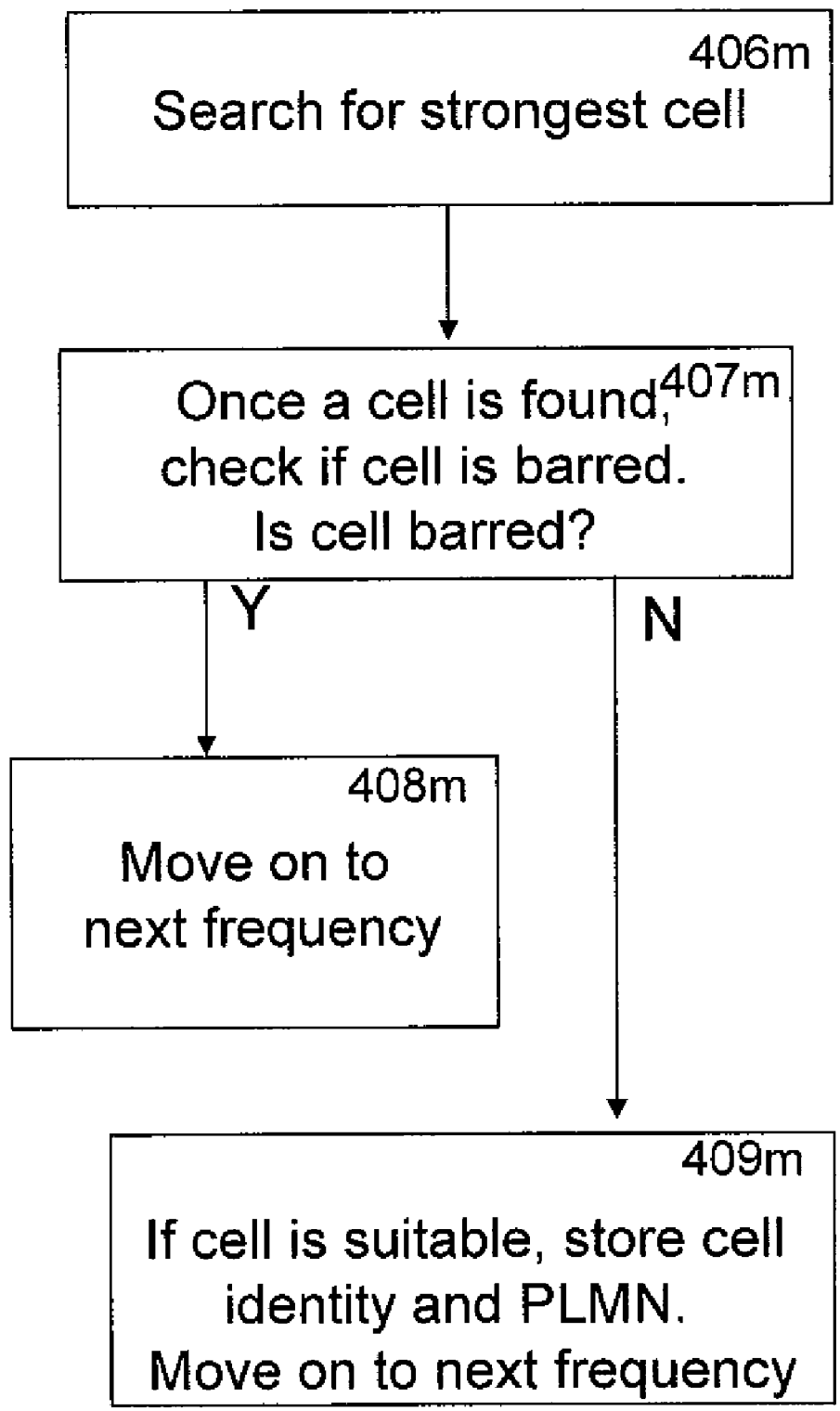
FIG. 5 is a flow diagram showing processes performed by a UE during a manual cell selection procedure in accordance with an embodiment of the present disclosure.

FIG. 4 shows the process for an automatic search. If a manual search is performed, 406-409 are replaced by 406m-409m of FIG. 5.

Referring to FIG. 5, 406m, 407m and 408m are identical to 406, 407 and 408. In contrast to 409 of FIG. 4, in FIG. 5 if the cell is suitable at 409m the cell identity using the Primary Scrambling Code (PSC) and Frequency of the cell is stored along with the PLMN for inclusion in the PLMN list. The UE then moves on to the next frequency, if there is one, by performing 406m to 408m for the frequency which has the next highest RSSI value.

A barred cell is a cell that a UE is not allowed to camp on. Barred cell information is typically stored as a list/array. In UMTS for example the barred cell information is stored in as barredCellList in the UMTS Access Stratum as part of the Meas Module. When a cell is barred, which may be for one of various reasons, the cell is added to the list. Typically, the following information is stored for a barred cell: (a) Primary Scrambling Code (PSC) of the cell, (b) Frequency of the cell, (c) Reason for barring the cell, (d) Time for which cell is barred, and (e) Time left to unbar the cell (updated dynamically every second).

Reasons for which a cell may be barred include: (i) "Authentication Reject"—see 3GPP 25.331 section 8.1.4a.1 which is incorporated herein by reference, (ii) SIB3—see 3GPP 25.304 section 5.3.1.1 which is also incorporated herein by reference, (iii) SIBs are broken in the cell, (iv) PCCPCH setup failure and (v) cell is in a forbidden location area.

The present teaching recognises that barred cell information which is held separately can be checked before checking that a cell is suitable/attempting to camp on to a cell which require setting up PCCPCH and reading MIBs and SIBs. In this way a cell which cannot be used (since it is barred) can be dismissed without setting up PCCPCH and reading MlBs and SIBs. In other words, barred cells are not reported during cell search/selection. The result of this is that the UE need not set up channels (PCCPCH) towards layer 1 and unnecessarily use layer 1 resources to read MlBs and SIBs only to find after a delay of some milliseconds that the cell is barred and not suitable to camp on. The cumulative time wasted can create bad user experience (particularly when performing a manual search), cause delays in emergency calls and unnecessarily use battery resource which has a negative effect on battery life.

Figure 6:
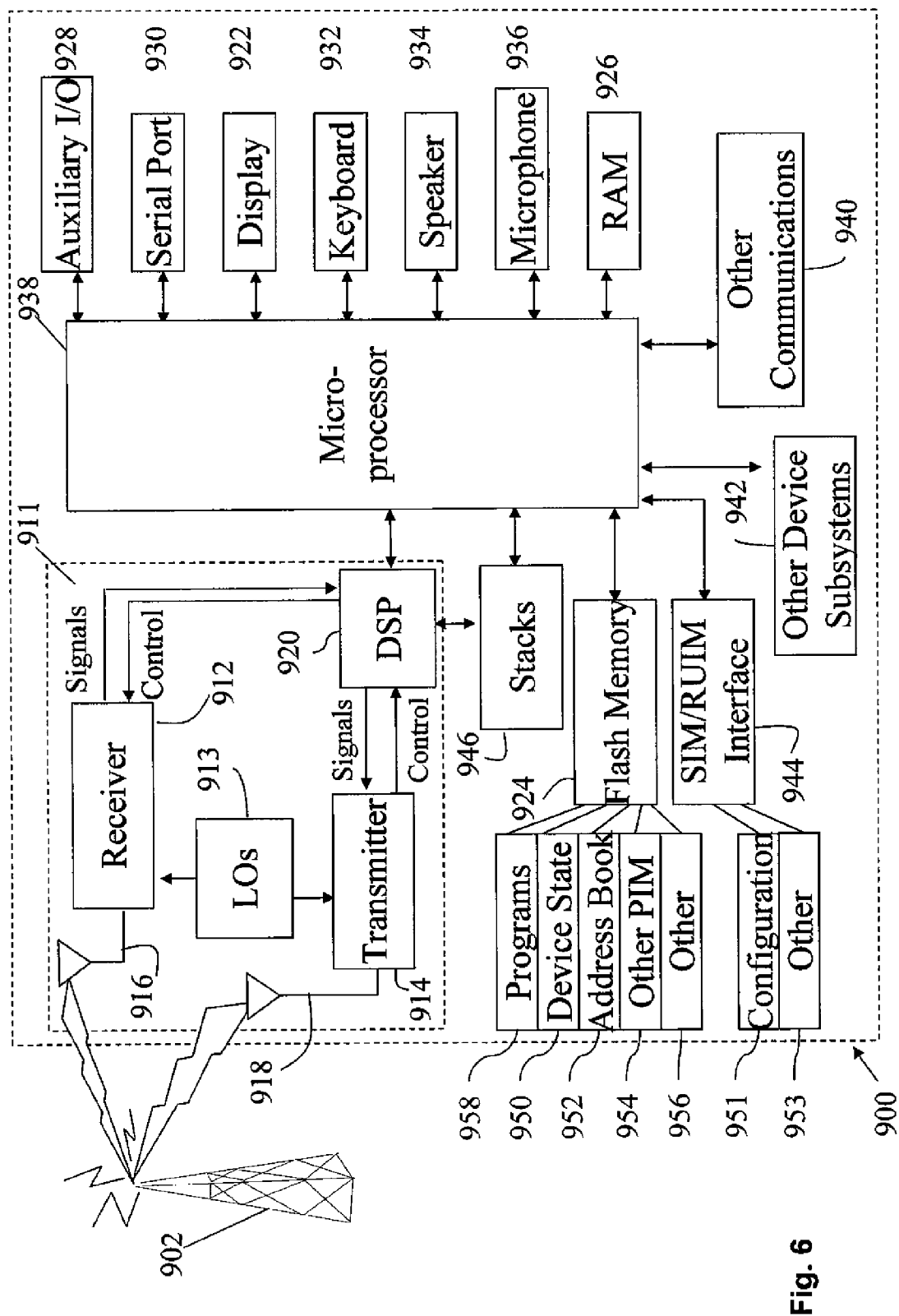
FIG. 6 is a block diagram illustrating a mobile device, which can act as a UE in accordance with the approach described herein.

Turning now to FIG. 6, this is a block diagram illustrating a mobile device, which can act as a UE and co-operate with the apparatus and methods of FIGS. 1 to 5, and which is an example wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" or "112" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911.

Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 4 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station users corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 6, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

Extensions and Alternatives

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order, can be varied and as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method for cell selection in a radio access network covering a geographical area divided into a plurality of cells, the method comprising at a mobile communications device:
    performing frequency scanning of all bands supported by the mobile communications device to obtain a signal strength indicator value for each frequency;
    sorting the frequencies according to the signal strength by sorting them by their respective signal strength indicator values;
    starting with the frequency with the highest signal strength indicator value, searching for a cell on the frequency;
    when a cell is found on the frequency, checking to see if the cell is a barred cell; and
    conditional on identifying the cell as a barred cell performing a search for a cell on another frequency, if there is one;
    when the cell is not a barred cell, checking whether the cell is a suitable cell and, when the cell is a suitable cell, attempt to camp on the cell and, when the cell is not a suitable cell, performing a search for a cell on another frequency, if there is one.

2. A method according to claim 1, wherein the checking to see if the cell is a barred cell is performed before checking that the cell is a suitable cell on criteria other than the cell being barred.

3. A method according to claim 1, wherein the checking to see if the cell is a barred cell and the conditional on identifying the cell as a barred cell performing a search for a cell on another frequency are performed without checking that the cell is a suitable cell on criteria other than the cell being barred.

4. A method according to claim 1, wherein the checking to see if the cell is a barred cell and the conditional on identifying the cell as a barred cell performing a search for a cell on another frequency are performed without attempting to camp on to the cell.

5. A mobile communication device for use in a radio access network covering a geographical area divided into a plurality of cells, comprising:

one or more processors;
a wireless transceiver coupled to the one or more processors;
memory coupled to the one or more processors;
the one or more processors being operative to:
perform frequency scanning of all bands supported by the mobile communications device to obtain a signal strength indicator value for each frequency;
sort the frequencies according to the signal strength by sorting them by their respective signal strength indicator values;
starting with the frequency with the highest signal strength indicator value, search for a cell on the frequency;
when a cell is found on the frequency, check to see if the cell is a barred cell; and
conditional on identifying the cell as a barred cell perform a search for a cell on another frequency, if there is one;
when the cell is not a barred cell, checking whether the cell is a suitable cell and, when the cell is a suitable cell, attempt to camp on the cell and, when the cell is not a suitable cell, perform a search for a cell on another frequency, if there is one.

6. A mobile communication device according to claim 5, wherein the one or more processors are operative to (i) check to see if the cell is a barred cell and (ii) conditional on identifying the cell as a barred cell perform a search for a cell on another frequency, without attempting to camp on to the cell.

7. A mobile communication device according to claim 5, wherein the one or more processors are further operative to:
check, conditional on identifying the cell as not being a barred cell, that the cell is a suitable cell on criteria other than the cell being barred.

8. A non-transitory computer program product comprising program code stored on a computer readable medium, the program code arranged, in use, to:
perform frequency scanning of all bands supported by a mobile communications device to obtain a signal strength indicator value for each frequency;
sort the frequencies according to the signal strength by sorting them by their respective signal strength indicator values;
starting with the frequency with the highest signal strength indicator value, search for a cell on the frequency;
when a cell is found on the frequency, check to see if the cell is a barred cell; and
conditional on identifying the cell as a barred cell perform a search for a cell on another frequency, if there is one;
when the cell is not a barred cell, checking whether the cell is a suitable cell and, when the cell is a suitable cell, attempt to camp on the cell and, when the cell is not a suitable cell, perform a search for a cell on another frequency, if there is one.

* * * * *